INVENTOR.
WALTER H. STEINKE,
BY J. K. Haskell
ATTORNEY.

Jan. 18, 1966 W. H. STEINKE 3,230,465

DIODE PARAMETRIC AMPLIFIER WITH SINGLE ADJUSTABLE COAXIAL CAVITY

Filed Oct. 10, 1963 4 Sheets-Sheet 2

INVENTOR.
WALTER H. STEINKE,
BY J. K. Haskell
ATTORNEY.

INVENTOR.
WALTER H. STEINKE,
BY J. K. Haskell
ATTORNEY.

INVENTOR.
WALTER H. STEINKE,
BY J. K. Haskell
ATTORNEY.

United States Patent Office 3,230,465
Patented Jan. 18, 1966

3,230,465
DIODE PARAMETRIC AMPLIFIER WITH SINGLE ADJUSTABLE COAXIAL CAVITY

Walter H. Steinke, Manhattan Beach, Calif., assignor to Hughes Aircraft Company, Culver City, Calif., a corporation of Delaware Filed Oct. 10, 1963, Ser. No. 315,233
3 Claims. (Cl. 330—4.9)

This invention relates to a parametric amplifier and more particularly to a reflective, single cavity type parametric amplifier utilizing a semiconductor element as its required nonlinear reactance device.

Parametric amplifiers, sometimes called "paramps," have been increasingly utilized in microwave systems in recent years as a means for amplifying low-level microwave signals with the introduction of very low noise component. The basic principles of operation of this type of device are now well known in the art and will not be discussed here. Rather, reference is made to such publications on the subject as: "Gain, Bandwidth and Noise Characteristics of the Variable Parametric Amplifier" in the Journal of Applied Physics, Vol. 29, pages 1321–1331, September 1958, by H. Heffner and G. Wade; "Theory of Parametric Amplification Using Nonlinear Reactance" in R.C.A. Review, Vol. 18, pages 578–596, December 1957, by S. Bloom and K. K. N. Chang.

In the past, parametric amplifiers had the disadvantage of having a relatively narrow simultaneous band-pass response, or the disadvantage of being incapable of operation with more than one band-pass response, or both. Also, the ability to optimize signal coupling over a particular band of frequencies and the ability to operate both in the quasi-degenerate and the non-degenerate mode of operation was generally not available.

Therefore it is an object of the present invention to provide a relatively broad band-low noise—high-gain parametric amplifier.

It is another object of the invention to provide a parametric amplifier which has the ability to optimize signal coupling over a particular band of frequencies.

It is still another object of the present invention to provide an amplifier which is capable of operation with different band-pass responses and is easily fabricated from stock microwave components.

It is a further object of this invention to provide a parametric amplifier capable of both quasi-degenerate and non-degenerate operation.

In accordance with the present invention, the above-noted objects are achieved in a parametric amplifier comprising a rectangular waveguide section having an open end, a terminating end and a centrally disposed longitudinal axis. The amplifier also includes a coaxial cavity structure which extends outwardly from the terminating end of the waveguide section and communicates with the interior of the waveguide section and is symmetrically disposed along the above-mentioned longitudinal axis. A varactor diode is symmetrically disposed within the coaxial cavity structure, the diode having a terminal projecting toward the terminating end of the waveguide section. Further, in accordance with the invention, there is included a crossbar coupler disposed within the waveguide section, spaced from the coaxial cavity structure, and has a stem portion slidably connected to the diode terminal along the longitudinal axis thereof. The amplifier is still further provided with bias means coupled with the diode, and waveguide means coupled to the coaxial cavity structure for introducing pump energy to the diode. In order to provide conversion between rectangular and coaxial modes of operation, an adjustable waveguide matching stub is coupled to the waveguide section and is in communication with the interior thereof.

The invention and specific embodiments thereof will be described hereinafter by way of example and with reference to the accompanying drawings, in which.

Figure 1:
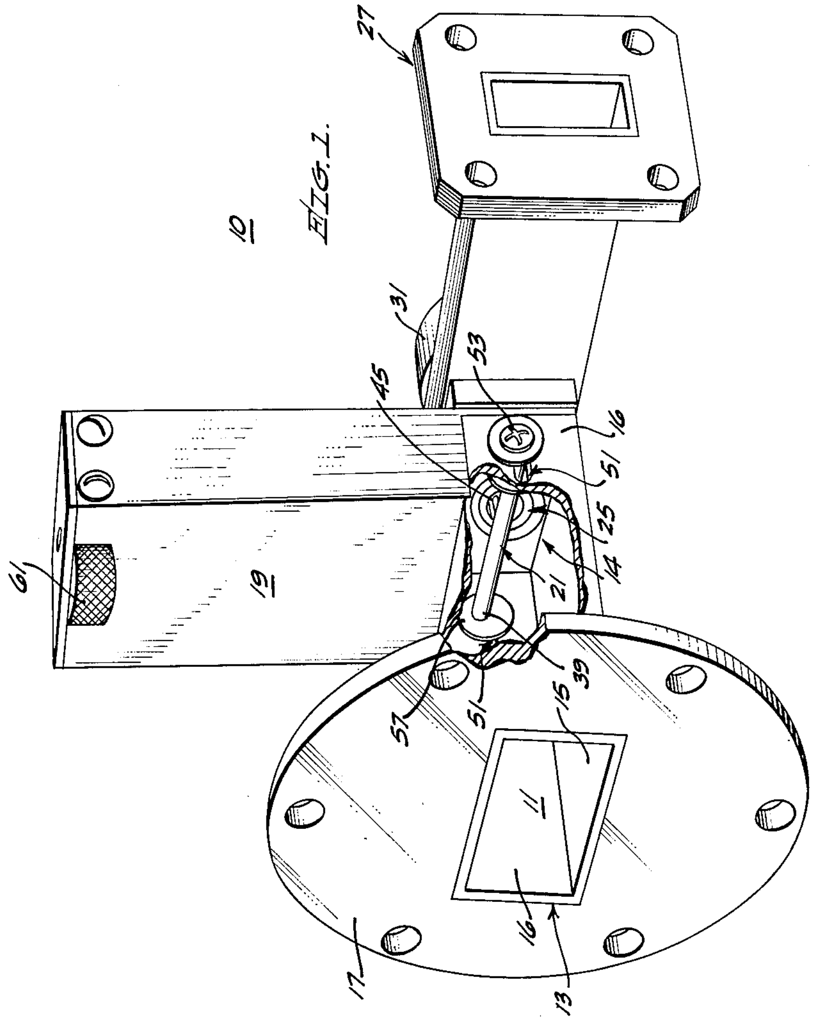
FIG. 1 is a perspective view of a preferred embodiment of a parametric amplifier in accordance with the present invention.
Figure 2:
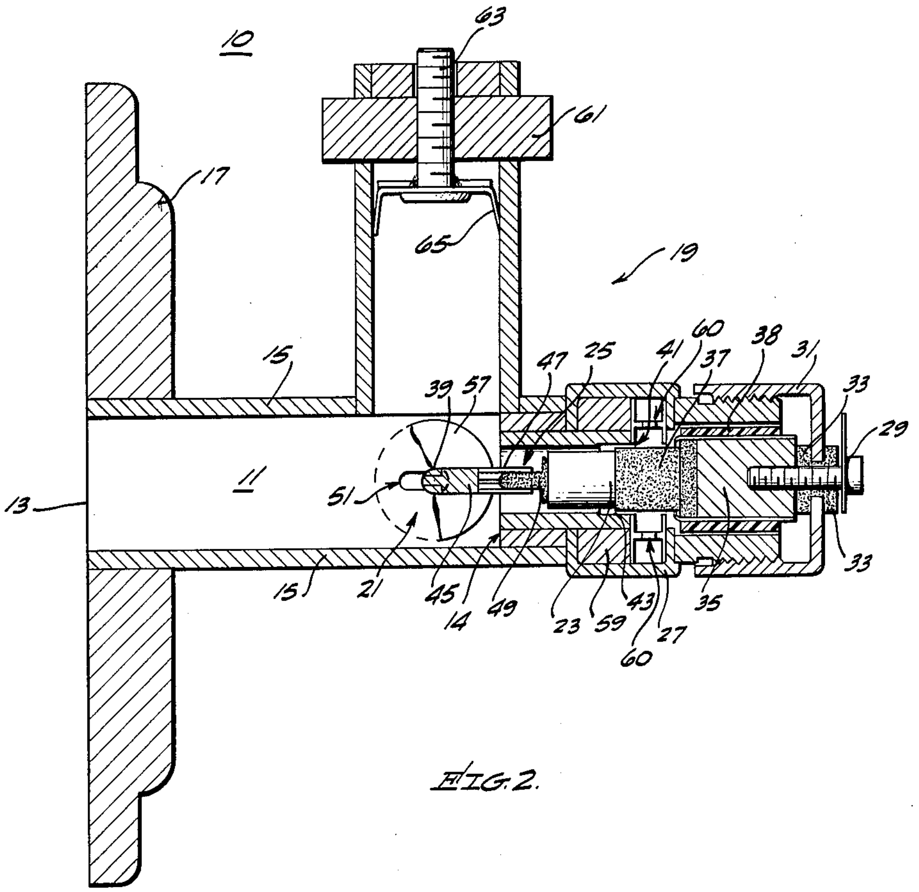
FIG. 2 is a cross-sectional view of the parametric amplifier of FIG. 1.
Figure 3:
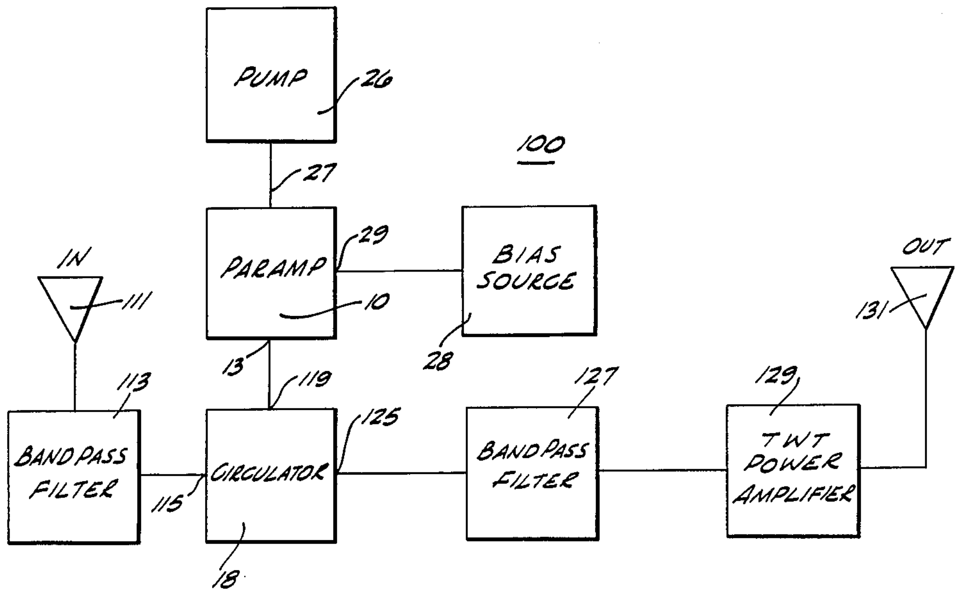
FIG. 3 is a block diagram of frequency converter and amplifier for use as a communication relay and utilizing the parametric amplifier of FIGS. 1 and 2.

Referring now to the drawings, and more particularly to the parametric amplifier 10 of FIGS. 1, 2 and 3, there is shown a rectangular waveguide section 11 having an open end 13 and a terminating end 14. Also, the waveguide section 11 has parallel broad walls 15 and parallel narrow walls 16. The open end 13 is provided with a flange 17 for mechanically coupling the amplifier 10 to suitable waveguiding structure such as a circulator 18 (see FIG. 3) for introducing into the amplifier 10 a low level input signal having a frequency $f_s$.

An appropriate disposed waveguide stub 19 in conjunction with an appropriately disposed crossbar coupler 21 is provided to convert the input signal from a rectangular mode of propagation to a coaxial mode of propagation for series coupling to a varactor diode 23 symmetrically disposed within a coaxial cavity structure 25.

Pump energy from a pump energy source 26 (see FIG. 3), having an appropriate frequency $f_p$, chosen for a particular type of parametric operation (quasi-degenerate or non-degenerate), is introduced to the diode 23 by waveguiding means 27 coupled to the coaxial cavity structure 25.

Bias voltage from a bias voltage source 28 (see FIG. 3) is coupled to the diode 23 by means of a screw terminal 29, insulated from an adjustable cap nut 31 by an insulating grommet 33, and by means of a conductive electrode socket 35 which contacts and retains a relatively large diameter terminal 37 of the diode 23. As shown in FIG. 2, the socket 35 is prevented from shorting to surrounding surfaces by a cylindrical insulative member 38.

From the above, it can be seen that the pump energy and the signal energy are present in the resonant cavity 25 which contains the properly biased diode 23. By a phenomenon well known in the parametric amplifier art, these energies having frequencies $f_p$ and $f_s$, respectively, react and provide what is known as idler energy having a frequency $f_i = f_p \pm f_s$. At least a portion of the idler energy is translated by the nonlinear reactance characteristic of the diode 23 into amplified signal energy.

The amplified signal energy having a frequency $f_s$ is then propagated toward the open end 13 of the waveguide section 11 by means of the crossbar coupler 21 in conjunction with the matching stub 19 in the same manner as the input signal energy was propagated into the coaxial cavity structure 25, but in the opposite direction.

The advantages inherent in the invention as shown in FIGS. 1 and 2 are largely due to the feature of an adjustable coaxial cavity length. The length of the cavity 25 is determined by the distance between a cylindrical rod 39 portion of the cross bar coupler 21 and a cavity terminating capacitor 41 existing between the terminal 37 of the diode 23 and an outer cylinder wall 43 of the coaxial cavity structure 25. As can be seen from FIG. 2, a stem portion 45 is connected centrally of the length of the rod portion 39 and makes slidable contact by a finger portion 47 with a relatively small terminal 49 of the diode 23.

The crossbar coupler 21 is thus adjustable along the longitudinal axis of the cavity structure 25 which axis is coextensive with the longitudinal axis of the rectangular waveguide section 11. The position of the crossbar coupler 21 is retained at any desired point along horizontal slots 51 in the narrow walls 16 by means of screws 53 threadedly engaged with threaded apertures (not shown) in the ends of the cylindrical rod 39. It should be noted that the movement of the crossbar coupler 21 along the slots 51 does not disturb the impedance of coupler 21 as seen by electromagnetic energy propagating within the waveguide section 11 since the distance relative to the parallel broad walls 15 is not changed. The rod 39 is provided with discs 57 at the ends thereof in order to assure good electrical contact with the narrow walls 16.

Another advantageous feature of the invention is the variability of the cavity terminating capacitor 41. The capacitance of the capacitor 41 is varied by rotating the adjustable cap nut 31 which moves the cap nut 31 either inwardly or outwardly with respect to the coaxial cavity structure 25. The movement of the cap nut 31 in turn moves the diode 23 along the longitudinal axis of the cavity structure 25. The value of the capacitance of the capacitor 41 is dependent upon the extent the circumferential area of the electrode 37 is adjacent the circumferential area of the outer cylinder wall 43. Thus, the rotation of the cap nut 31 will allow optimizing the value of capacitance with regard to the particular frequencies of signal, pump and idler involved.

The relatively high frequency pump energy introduced into the coaxial cavity structure 25 by the waveguiding means 27 sees a fairly low impedance produced by the cavity terminating capacitor 41 and, in order to obtain efficient coupling into the area of the diode 23, the waveguide 27 is reduced in height by blocks 59 and the waveguiding means 27 is provided with an adjustable shorting means, only the fingers 60 of which can be seen in FIG. 2. These provisions are well known in the art and will not be discussed further here. The lower frequency signal and idler energies, on the other hand, are for the most part prevented from leaving the coaxial cavity area by the cavity terminating capacitor 41.

In quasi-degenerate operation (where $f_p$ is approximately but not exactly equal to $2f_s$, and $f_s=f_i$) the matching stub 19 is adjusted by means of a captivated rotating knob 61 threadedly engaged with a threaded screw 63 to move a shorting member 65 so that the distance between the crossbar coupler 21 and the shorting member 65 is $\lambda/4$ at the frequency of the signal energy. This adjustment provides for the proper phase matching needed in order that the incoming signal energy may be coupled into the coaxial cavity. Of course, since the pump energy is approximately twice the frequency of the signal energy, the same adjustment of the matching stub 19 will represent $\lambda/2$ at the frequency of the pump energy. Therefore, the pump energy will see a short or very low impedance and thus will be prevented from propagating toward the open end 13 of the waveguide 11.

In non-degenerate operation of the device shown in FIGS. 1 and 2, the frequency of the pump energy $f_p$ is more than $2f_s$ and the stub tuner 19 is not as efficient in preventing the pump energy for propagating along the waveguide section 11. In this case, the stub 19 can be adjusted for best rectangular-coaxial conversion and simultaneous pump energy filtering. Also, capacitive filtering beads (not shown), which are well known in the microwave art, may be positioned around the terminal 49 of the diode 23 to prevent the pump energy from leaving the cavity structure 25.

One use of the invention as described above is in a communication relay system and may be seen in a block diagram form in FIG. 3. Here, there is shown a frequency converter and amplifier 100 where an input signal from an appropriate source (not shown) is intercepted by an antenna 111 and conveyed through a band-pass filter 113 passing frequencies between 5,700 mc. and 5,850 mc. to a first port 115 of a circulator 18. The circulator 18 routes the filtered input signal to a second port 119 where the signal is coupled to the open end 13 of the parametric amplifier 10. The amplifier 10 is coupled to a bias voltage source 28 for proper operation of the varactor diode 23, and to a pump energy source 26 providing pump energy at a frequency of 12,000 mc. for this particular case. The value of the bias voltage provided by the source 28 will be of the order of a few volts (negative) and will vary for different diodes used.

As discussed above, the amplifier 10 amplifies the input signal and propagates the amplified signal out from the open end 13 toward the second port 119 of the circulator 18. In the instant case, the parametric amplifier 10 is operated in the quasi-degenerate mode and, thus, available as an amplified output of the device, is an amplified output signal having a frequency $f_s$ and an idler frequency energy $f_i$ which is close to but not equal the input signal frequency. In the case shown in FIG. 3, $f_s$=5,750 mc. to 5,850 mc. and $f_i$=6,150 mc. to 6,250 mc. The idler energy, due to a phenomenon well known in the art, contains the same information as is present in the amplified signal energy.

As can be seen from FIG. 3, the idler and amplified signal energies are routed to a third port 125 of the circulator 18 and coupled to a band-pass filter 127 which only passes electromagnetic energies of frequencies between 6,150 mc. and 6,250 mc. The energy thus passed by the filter 127 is coupled to a traveling wave amplifier 129 and propagated into the ether by means of transmitting antenna 131.

A $\lambda/4$ matching stub 19 has been shown in the drawings, however, any odd multiple of $\lambda/4$ will also provide a workable device with the loss of some bandwidth due to the increased Q.

Figures 4, 5:
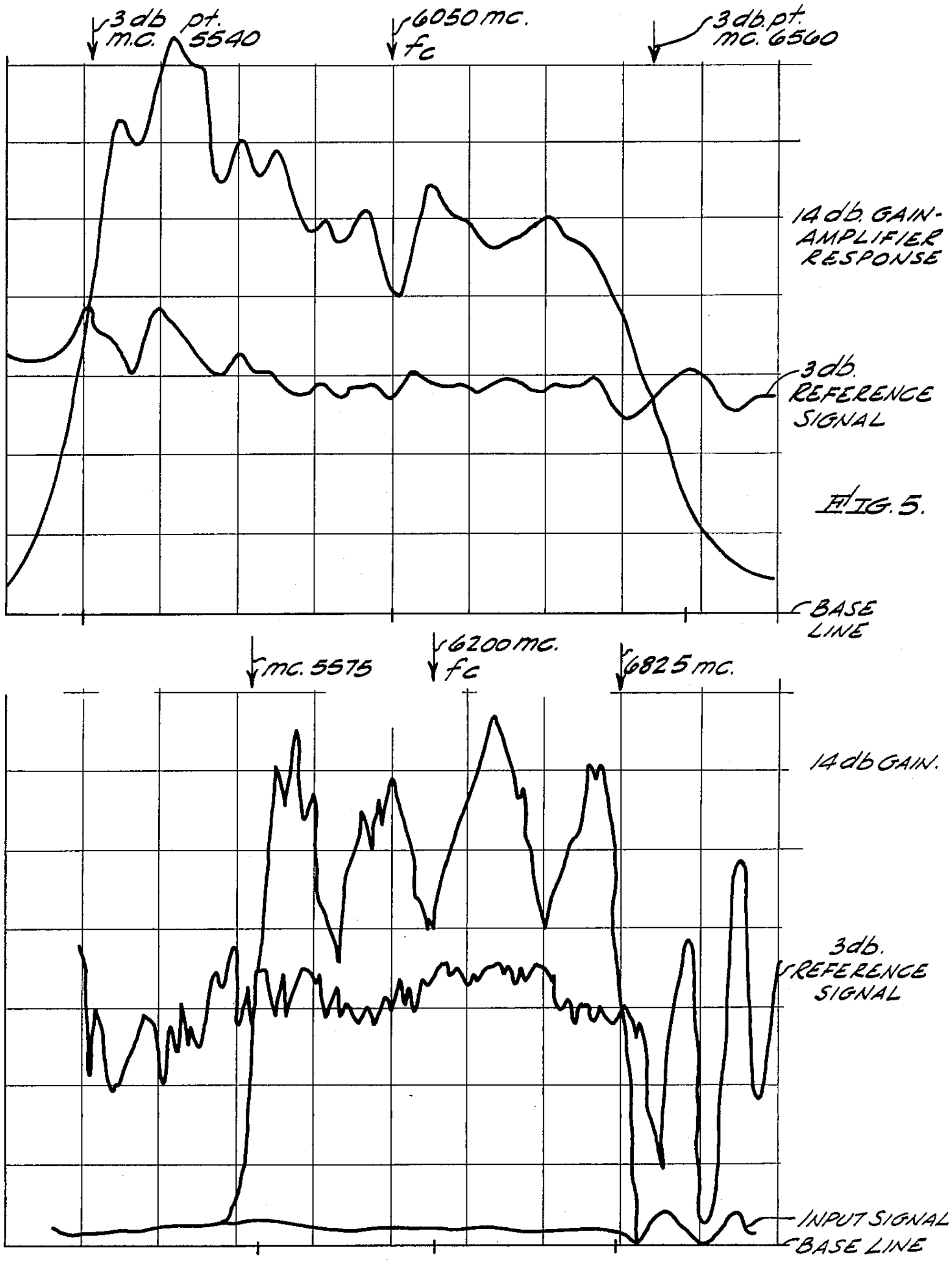
FIGS. 4 and 5 illustrate typical band-width response curves for the parametric amplifier shown in FIGS. 1 and 2.

Referring now to FIGS. 4 and 5, there is shown two band-pass curves representing the performance of a parametric amplifier operating in the quasi-degenerate mode of operation embodying the inventive features of the present invention. FIG. 4 illustrates the band-pass characteristics obtained by the instant parametric amplifier operating at a center frequency of 6,200 mc. The bandwidth here is 1,250 mc. or 20% and the gain of the amplifier is 14 db. FIG. 5 illustrates the band-pass characteristics obtained for the same amplifier operating at a center frequency of 6.050 mc. Here, 14 db gain is again evidenced but the band-pass is reduced to 1,020 mc. or about 16%. The input signal curve is not displayed in FIG. 5.

Accordingly, although the present invention has been shown and described with reference to a particular embodiment, nevertheless, various changes and modifications, such as the means for introducing the pump energy into the coaxial cavity, which are obvious to one skilled in the art are deemed to be within the spirit, scope and contemplation of the invention.

From the foregoing it can be seen that there is achieved an improved, relatively broad band-low noise-high-gain parametric amplifier which provides the ability to optimize signal coupling over a particular band of frequencies, capable of operation with different band-pass responses and which is easily fabricated for the most part from stock microwave components.

What is claimed is:

1. A parametric amplifier comprising: a rectangular waveguide section having an open end, a terminating end and a centrally disposed longitudinal axis; a coaxial cavity structure extending outwardly from said terminating end, communicating with the interior of said waveguide section and symmetrically disposed along said longitudinal axis; a varactor diode symmetrically disposed within said coaxial cavity structure, said diode having a terminal projecting toward said terminating end; a crossbar coupler disposed within said waveguide section spaced from said coaxial cavity structure and having a stem portion slidably connected to said terminal along said longitudinal axis; bias means coupled with said diode; waveguiding means coupled to said coaxial cavity structure for introducing pump energy to said diode; and an adjustable waveguide matching stub coupled to said waveguide section and in communication with the interior thereof to provide conversion between rectangular and coaxial modes of operation.

2. A parametric amplifier comprising: a rectangular waveguide section having an open end, a terminating end and a centrally disposed longitudinal axis; a coaxial cavity structure extending outwardly from said terminating end, communicating with the interior of said waveguide section and symmetrically disposed along said longitudinal axis, said cavity structure including an outer cylinder wall; a longitudinally displaceable varactor diode disposed within said coaxial cavity structure, said varactor diode having a relatively small diameter terminal projecting toward said terminating end, said varactor diode also having a relatively large diameter cylindrical terminal providing in conjunction with said outer cylinder wall a variable cavity termination capacitance dependent upon the axial position of said varactor diode; cavity terminating capacitance adjustment means mechanically coupled to said varactor diode and to said cavity structure for axially displacing said varactor diode with respect to said cavity structure; a crossbar coupler disposed within said waveguide section spaced from said coaxial cavity structure and having a stem portion slidably connected to said small diameter terminal along said longitudinal axis; bias means coupled with said varactor diode; waveguiding means coupled to said coaxial cavity structure for introducing pump energy to said varactor diode; and adjustable waveguide matching stub coupled to said waveguide section and in communication with the interior thereof to provide conversion between rectangular and coaxial modes of operation.

3. A parametric amplifier comprising: a rectangular waveguide section with parallel broad and narrow walls, said waveguide section having an open end adapted to be coupled to a circulator structure and having a terminating end, said waveguide section further having a centrally disposed longitudinal axis; a coaxial cavity symmetrically disposed along said longitudinal axis extending from said terminating end and communicating with the interior of said waveguide section, said cavity structure including a central conductor and an outer cylinder wall; a rectangular-to-coaxial waveguide converting structure, said converting structure including an adjustable rectangular waveguide matching stub perpendicularly extending from one of said broad walls adjacent said terminating end and including an adjustable crossbar coupler disposed within said waveguide section spaced from said cavity structure, said coupler including a cylindrical conductive rod positioned between and perpendicularly to said narrow walls and movable in a plane centrally between and parallel to said broad walls, said coupler further including a stem portion projecting perpendicularly from said cylindrical conductive rod along said longitudinal axis of said waveguide section toward said coaxial cavity; a longitudinally displaceable varactor diode positioned centrally within said coaxial cavity structure and a part of said central conductor, said varactor diode having a large diameter cylindrical terminal providing a variable cavity termination capacitance in conjunction with said outer cylinder wall, the value of said variable capacitance being dependent upon the longitudinal position of said varactor diode, said varactor diode also having a smaller diameter terminal slidably connected to said stem portion of said crossbar coupler; cavity terminating capacitance adjustment means mechanically coupled to said varactor diode and to said cavity structure for axially displacing said varactor diode with respect to said cavity structure; insulated bias means electrically connected to said large diameter terminal and electrically insulated from said cavity structure and said waveguide section for providing an insulated bias voltage path for said varactor diode; and pump energy waveguide structure coupled to said coaxial cavity structure for introducing pump energy into said coaxial cavity.

No references cited.

ROY LAKE, *Primary Examiner.*